United States Patent
Wu et al.

(10) Patent No.: US 10,659,800 B2
(45) Date of Patent: May 19, 2020

(54) INTER PREDICTION METHOD AND DEVICE

(71) Applicant: Hangzhou Hikvision Digital Technology Co., Ltd., Hangzhou (CN)

(72) Inventors: Xiaoyang Wu, Hangzhou (CN); Linjie Shen, Hangzhou (CN); Hui Su, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 0 days.

(21) Appl. No.: 15/317,444

(22) PCT Filed: Nov. 17, 2014

(86) PCT No.: PCT/CN2014/091240
§ 371 (c)(1),
(2) Date: Dec. 9, 2016

(87) PCT Pub. No.: WO2015/188585
PCT Pub. Date: Dec. 17, 2015

(65) Prior Publication Data
US 2017/0105018 A1    Apr. 13, 2017

(30) Foreign Application Priority Data
Jun. 10, 2014   (CN) .......................... 2014 1 0253454

(51) Int. Cl.
*H04N 19/503*   (2014.01)
*H04N 19/59*    (2014.01)
(Continued)

(52) U.S. Cl.
CPC ......... *H04N 19/503* (2014.11); *H04N 19/105* (2014.11); *H04N 19/159* (2014.11);
(Continued)

(58) Field of Classification Search
CPC .................................................. H04N 19/503
See application file for complete search history.

(56) References Cited

U.S. PATENT DOCUMENTS 6,078,617 A    6/2000   Nakagawa et al.
8,644,381 B2   2/2014   Huang et al.
(Continued)

FOREIGN PATENT DOCUMENTS

CN    101366281 A    2/2009
CN    101646084 A    2/2010
(Continued)

OTHER PUBLICATIONS

European Search Report for Application No. 14894440.8, dated Dec. 1, 2017.
(Continued)

*Primary Examiner* — William C Vaughn, Jr.
*Assistant Examiner* — Joseph Daniel A Towe
(74) *Attorney, Agent, or Firm* — Harness, Dickey & Pierce, P.L.C.

(57) ABSTRACT

When performing an inter predictive encoding on any image frame x is required, a reference image frame is determined for image x; image x is a P-frame image or a B-frame image; for each reference image frame, following processes are respectively performed: whether resolution of a reference image frame is the same as resolution of image x is determined; if resolution of the reference image frame is different from resolution of image x, resolution of reference image frame is adjusted to be the same as resolution of image x; if resolution of each reference image frame is the same as resolution of image x, inter predictive encoding is performed on image x based on each reference image frame.

6 Claims, 6 Drawing Sheets

(51) Int. Cl.
- *H04N 19/159* (2014.01)
- *H04N 19/563* (2014.01)
- *H04N 19/105* (2014.01)
- *H04N 19/172* (2014.01)
- *H04N 19/597* (2014.01)

(52) U.S. Cl.
CPC ......... *H04N 19/172* (2014.11); *H04N 19/563* (2014.11); *H04N 19/59* (2014.11); *H04N 19/597* (2014.11)

(56) References Cited

U.S. PATENT DOCUMENTS

| | | |
|---|---|---|
| 8,675,738 B2 | 3/2014 | Chang et al. |
| 9,319,677 B2 | 4/2016 | Chang et al. |
| 2007/0160153 A1 | 7/2007 | Sullivan |
| 2009/0207915 A1* | 8/2009 | Yan ................. H04N 19/53 375/240.16 |
| 2010/0034288 A1 | 2/2010 | Chang et al. |
| 2010/0118973 A1* | 5/2010 | Rodriguez ....... H04N 19/00927 375/240.25 |
| 2010/0150231 A1* | 6/2010 | Huang ............... H04N 19/159 375/240.12 |
| 2011/0026593 A1* | 2/2011 | New ..................... H03M 7/42 375/240.12 |
| 2011/0216833 A1 | 9/2011 | Chen et al. |
| 2012/0188375 A1 | 7/2012 | Funabashi |
| 2012/0269267 A1 | 10/2012 | Choi et al. |
| 2013/0089154 A1* | 4/2013 | Chen ................. H04N 19/70 375/240.25 |
| 2014/0028797 A1 | 1/2014 | Hattori et al. |
| 2014/0098881 A1 | 4/2014 | Chen et al. |
| 2014/0133580 A1 | 5/2014 | Chang et al. |
| 2014/0140407 A1 | 5/2014 | Yu et al. |
| 2014/0328398 A1* | 11/2014 | Chen ................. H04N 19/33 375/240.12 |
| 2016/0014411 A1* | 1/2016 | Sychev ............... H04N 19/56 375/240.12 |
| 2016/0100187 A1* | 4/2016 | Lee ................. H04N 19/139 375/240.16 |

FOREIGN PATENT DOCUMENTS

| | | |
|---|---|---|
| CN | 101765014 A | 6/2010 |
| CN | 101867816 A | 10/2010 |
| CN | 103493493 A | 1/2014 |
| CN | 103813174 A | 5/2014 |
| EP | 0883299 A2 | 12/1998 |
| EP | 1775957 A1 | 4/2007 |
| TW | 201023624 A | 6/2010 |

OTHER PUBLICATIONS

Chinese Office Action for Application No. 201410253454.X dated Oct. 31, 2017.
International Search Report for PCT/CN2014/091240 (English and Chinese), ISA/CN, Haidian District, Beijing, dated Mar. 10, 2015.
Written Opinion of the ISA for PCT/CN2014/091240 (Chinese), ISA/CN, Haidian District, Beijing, dated Mar. 10, 2015.
Chinese Office Action for Application No. 201410253454.X, dated May 2, 2018, and its English translation thereof.
Decision of Rejection for Chinese Application No. 201410253454.X dated Sep. 20, 2018.

* cited by examiner

INTER PREDICTION METHOD AND DEVICE

CROSS REFERENCE TO RELATED APPLICATIONS

The application is a 371 U.S. National Phase application based on PCT/CN2014/091240, filed on Nov. 17, 2014, which claims the benefit of Chinese application No. 201410253454.X, filed with the State Intellectual Property Office of People's Republic of China on Jun. 10, 2014, entitled "IMAGE ENCODING METHOD AND DEVICE AND IMAGE DECODING METHOD AND DEVICE", both of which are incorporated herein by reference in their entirety.

TECHNICAL FIELD

The application relates to image processing technologies, and more particularly, to an image encoding method and device and an image decoding method and device.

BACKGROUND

Video compressing refers to a process for converting a video sequence of a certain format into a video sequence of another format, by using a specific compressing technology.

Current video compression standards mainly include H.261, H.263 stipulated by International Telecommunication Union-Telecommunication Sector (ITU-T), Moving Pictures Experts Group-1 (MPEG-1) and MPEG-4 stipulated by International Standards Organization (ISO), and MPEG-2/H.262 jointly stipulated by ITU-T and ISO, and so on. Each foregoing standard adopts a block-based hybrid encoding framework, and one important technology therein is predictive encoding.

Generally, based on different sources of prediction data, each image frame in a video sequence is divided into following three types: I frame (intra prediction frame, Intra), P frame (inter prediction frame, Prediction), B frame (bi-direction prediction frame, Bi-prediction). Correspondingly, an image in the type of I frame is referred to as an I-frame image. An image in the type of P frame is referred to as a P-frame image. An image in the type of B frame is referred to as a B-frame image.

When performing the predictive encoding on an I-frame image, it is necessary to adopt data of a local frame. When performing the predictive encoding on a P-frame image, it is necessary to take at least one preceding image frame as the reference image frame. When performing the predictive encoding on a B-frame image, it is necessary to take at least one preceding image frame, or at least one subsequent image frame as the reference image frame. The reference image frame needs to be a re-constructed image. The re-constructed image refers to a decoded image, after being encoded.

As shown in FIG. 1, when performing a predictive encoding on the second P-frame image is required (according to the order from left to right), two preceding image frames may be taken as reference image frames.

As shown in FIG. 2, when performing a predictive encoding on a B-frame image therein is required, preceding two frame (forward reference frame) images and one subsequent frame (backward reference frame) image may be taken as reference image frames.

In practical applications, a predictive encoding mode corresponding to foregoing I-frame image is generally referred to as an intra predictive encoding. Predictive encoding modes corresponding to foregoing P-frame image and B-frame image are referred to as inter predictive encoding. The intra predictive encoding refers to predicting with data of a local frame. However, the inter predictive encoding refers to predicting with data of other frames.

Compared with the inter predictive encoding, encoding efficiency of the intra predictive encoding is lower, which may increase encoded rate, thereby increasing costs of transmission and storage.

In current processing methods, when performing intra predictive encoding on a certain image frame x of a video sequence, resolution of a reference image frame is required to be the same as resolution of image x. When the resolution of the reference image frame is different from the resolution of image x, it is considered that the video sequence has been switched. And processes are performed based on a new video sequence, i.e., take an I-frame image randomly accessed as a starting point. That is, when resolution of reference image frame is the same as resolution of image x, perform the inter predictive encoding on image x based on a normal mode; otherwise, perform the intra predictive encoding on image x.

Resolution refers to pixel number of width and height of an image. Suppose the resolution of image x is 704*576, 704 refers to horizontal pixel number of image x, and 576 refers to vertical pixel number of image x.

Figure 3:
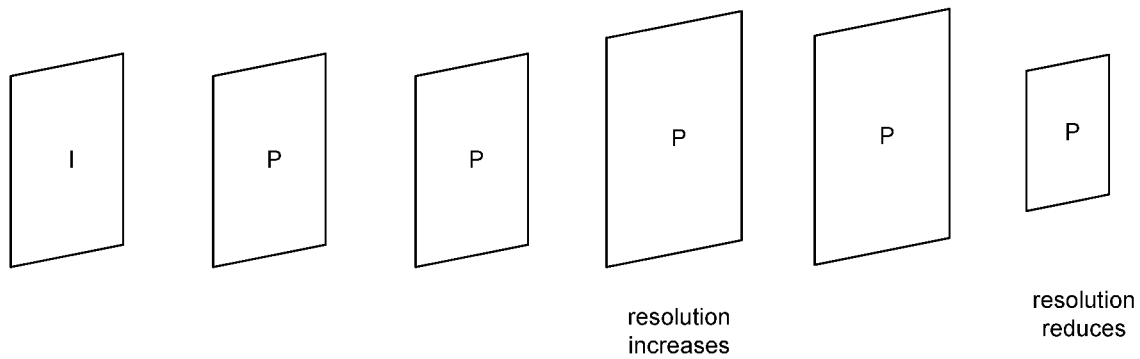

FIG. 3 is a schematic diagram illustrating resolution change of each image frame in a video sequence at present. As shown in FIG. 3, according to the order from left to right, in ideal conditions, it is hoped that except for the first image frame being the I-frame image, the remaining image frames are the P-frame images. However, resolution of the fourth image frame is greater than resolution of the third image frame. Resolution of the sixth image frame is less than resolution of the fifth image frame. Suppose the third image frame is the reference image frame of the fourth image frame, the fifth image frame is the reference image frame of the sixth image frame, due to difference with resolution of the reference image frame, the inter predictive encoding cannot be performed on the fourth image frame and the sixth image frame, what is allowed is the intra predictive encoding. That is, take the fourth image frame and the sixth image frame as the I-frame images to be processed.

In view of above, when performing a video compressing on a certain video sequence, if resolution of each image frame therein is the same, there is no problem. If resolution of each image frame therein changes frequently, e.g., in extreme cases, resolution of each image frame is different, only the intra predictive encoding is allowed to be performed on each image frame. As described above, encoding efficiency of the intra predictive encoding is lower, thereby increasing the bit rate after encoding, and further increasing costs of transmission and storage.

SUMMARY

In view of above, the present disclosure provides an image encoding method and device, so as to improve encoding efficiency. Correspondingly, the present disclosure also provides an image decoding method and device.

To achieve foregoing objectives, technical solutions of the present disclosure are as follows.

An image encoding method, including:

when an inter predictive encoding is required to be performed on an image frame x, determining a reference image frame of the image frame x, wherein the image frame x is a P-frame image or a B-frame image;

for each reference image frame, respectively performing following processes:

determining whether a resolution of a reference image frame is the same as a resolution of the image frame x;

when determining that the resolution of the reference image frame is different from the resolution of the image frame x, adjusting the resolution of the reference image frame to be the same as the resolution of the image frame x;

when determining that the resolution of the reference image frame is the same as the resolution of the image frame x, performing the inter predictive encoding on the image frame x, based on each reference image frame.

An image encoding device, including a first processing module and a second processing module, wherein the first processing module is to determine a reference image frame for an image frame x, and inform the second processing module, when an inter predictive encoding is required to be performed on the image frame x, wherein the image frame x is a P-frame image or a B-frame image; and, the second processing module is to respectively perform following processes on each reference image frame: determine whether a resolution of a reference image frame is the same as a resolution of the image frame x, when determining that the resolution of the reference image frame is different from the resolution of the image frame x, adjusting the resolution of the reference image frame to be the same as the resolution of the image frame x; when determining that the resolution of the reference image frame is the same as the resolution of the image frame x, perform the inter predictive encoding on the image frame x based on each reference image frame.

An image decoding method, including:

when decoding an image frame y with an inter predictive encoding performed is required, determining a reference image frame for the image frame y;

respectively performing following processes on each reference image frame: when determining that a resolution of a reference image frame is different from the resolution of the image frame y, adjusting the resolution of the reference image frame to be the same as the resolution of the image frame y;

when determining that resolution of each reference image frame is the same as the resolution of the image frame y, decoding the image frame y based on each reference image frame.

An image decoding device, including a third processing module and a fourth processing module, wherein when decoding an image frame y with an inter predictive encoding performed is required, the third processing module is to determine a reference image frame for the image frame y, and inform the fourth processing module; and, the fourth processing module is to respectively perform following processes on each reference image frame:

when determining that a resolution of a reference image frame is different from the resolution of the image frame y, adjust the resolution of the reference image frame to be the same as the resolution of the image frame y;

when determining that resolution of each reference image frame is the same as the resolution of the image frame y, decode the image frame y based on each reference image frame.

In view of above, it can be seen that by adopting the solutions of the present disclosure, when the inter predictive encoding is required to be performed on any image frame x, if resolution of the reference image frame is different from resolution of image x, firstly adjust the resolution of the reference image frame to be the same as the resolution of image x, and then perform the inter predictive encoding on image x, so as to avoid problems in the prior art. Correspondingly, encoding efficiency may be improved, the bit rate after encoding may be reduced, thereby further reducing costs of transmission and storage, and so on.

BRIEF DESCRIPTIONS OF THE DRAWINGS

Figure 1:
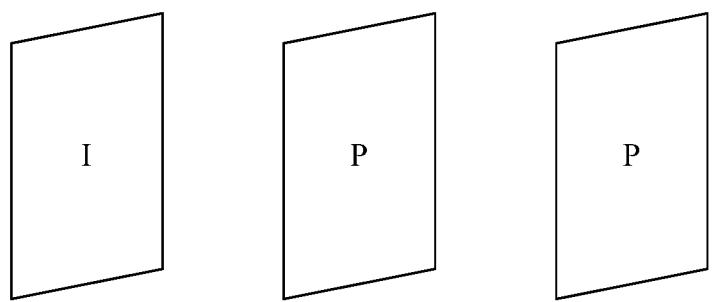
FIG. 1 is a schematic diagram illustrating a reference image frame of current P-frame image.

FIG. 1 is a schematic diagram illustrating a reference image frame of current P-frame image.

Figure 2:
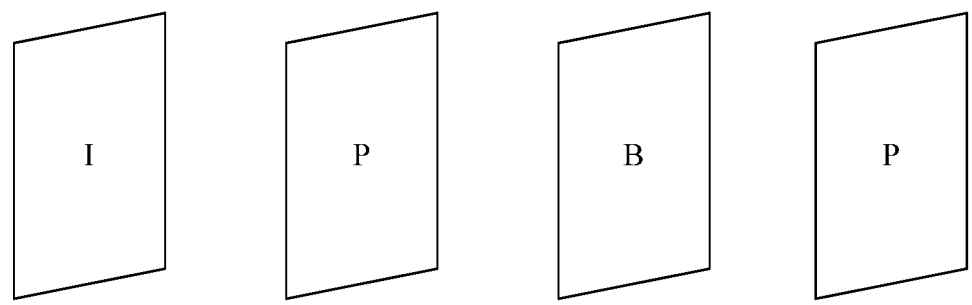
FIG. 2 is a schematic diagram illustrating a reference image frame of current B-frame image.

FIG. 2 is a schematic diagram illustrating a reference image frame of current B-frame image.

FIG. 3 is a schematic diagram illustrating resolution change of each image frame in a certain video sequence at present.

Figure 4:
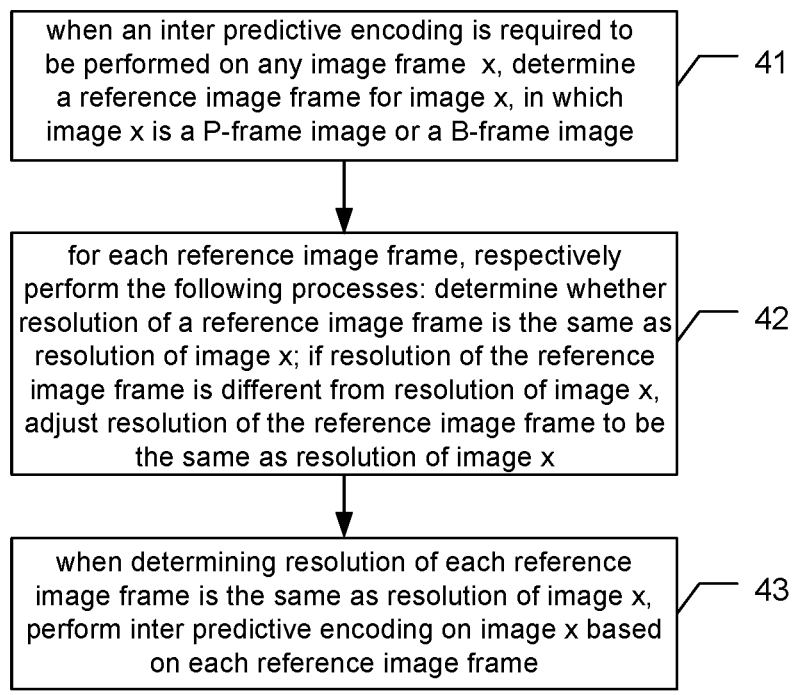

FIG. 4 is a flowchart illustrating an image encoding method, in accordance with an example of the present disclosure.

Figure 5:
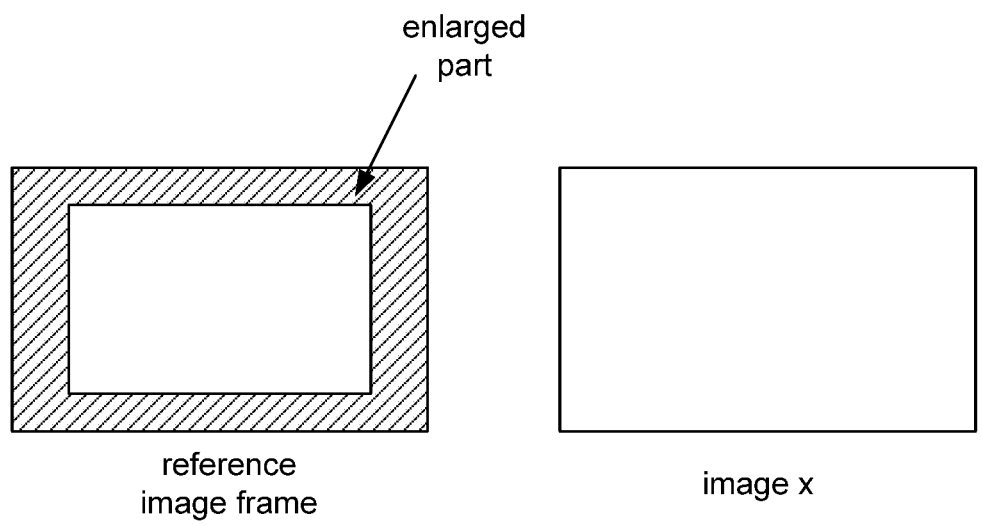

FIG. 5 is a schematic diagram illustrating to adjust resolution of a reference image frame to be the same as resolution of image x, by image enlarging, in accordance with an example of the present disclosure.

Figure 6:
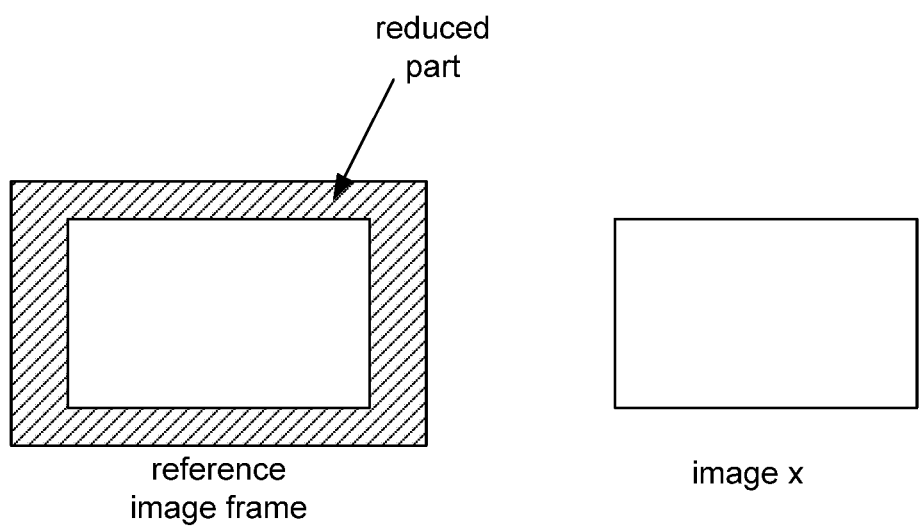

FIG. 6 is a schematic diagram illustrating to adjust resolution of a reference image frame to be the same as resolution of image x, by image reducing, in accordance with an example of the present disclosure.

Figure 7:
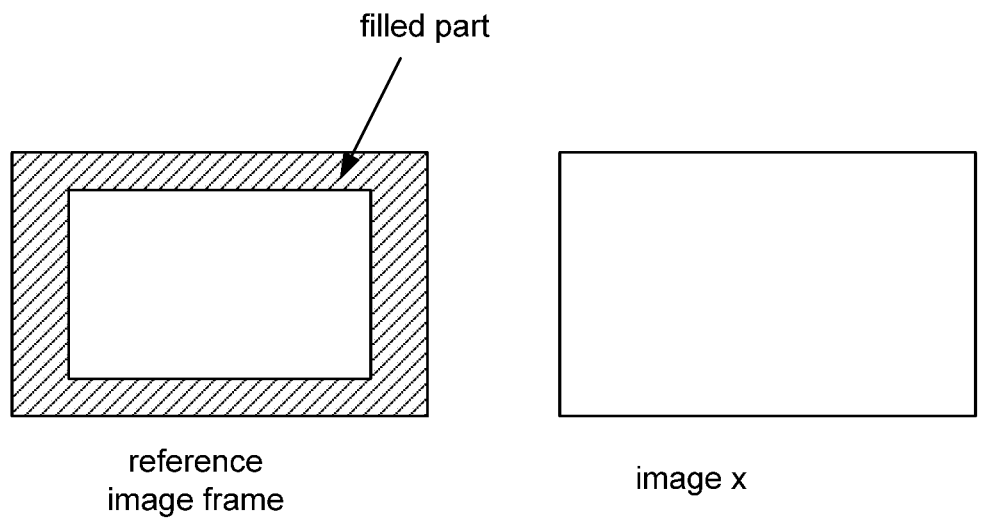

FIG. 7 is a schematic diagram illustrating to adjust resolution of a reference image frame to be the same as resolution of image x, by image filling, in accordance with an example of the present disclosure.

Figure 8:
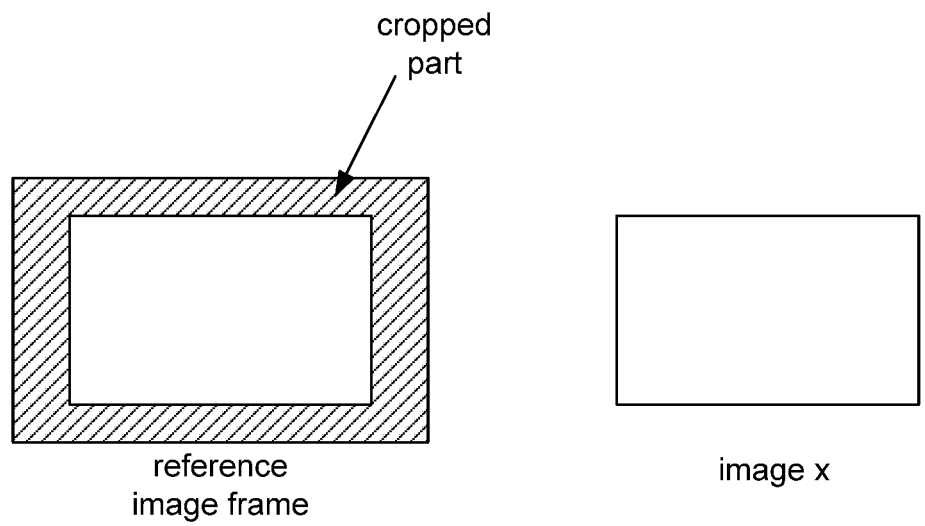

FIG. 8 is a schematic diagram illustrating to adjust resolution of a reference image frame to be the same as resolution of image x, by image cropping, in accordance with an example of the present disclosure.

Figure 9:
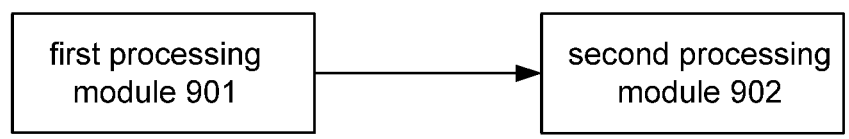

FIG. 9 is a schematic diagram illustrating structure of an image encoding device, in accordance with an example of the present disclosure.

Figure 10:
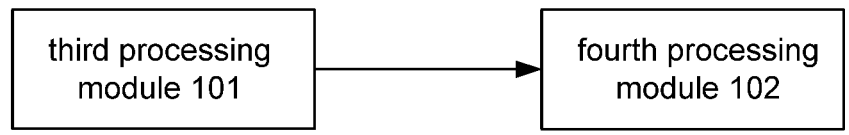

FIG. 10 is a schematic diagram illustrating structure of an image decoding device, in accordance with an example of the present disclosure.

Figure 11:
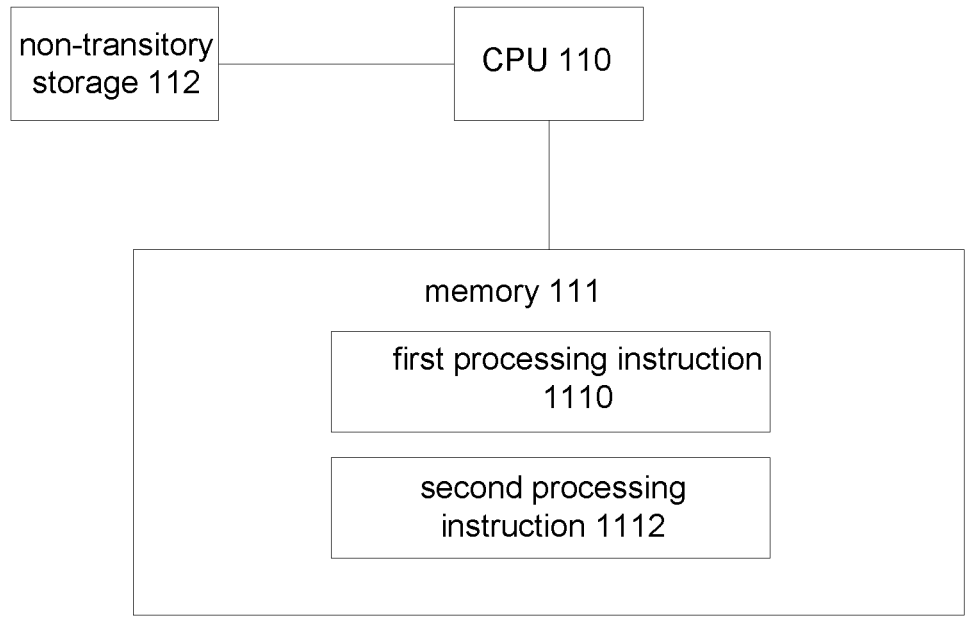

FIG. 11 is a schematic diagram illustrating structure of another image encoding device, in accordance with an example of the present disclosure.

Figure 12:
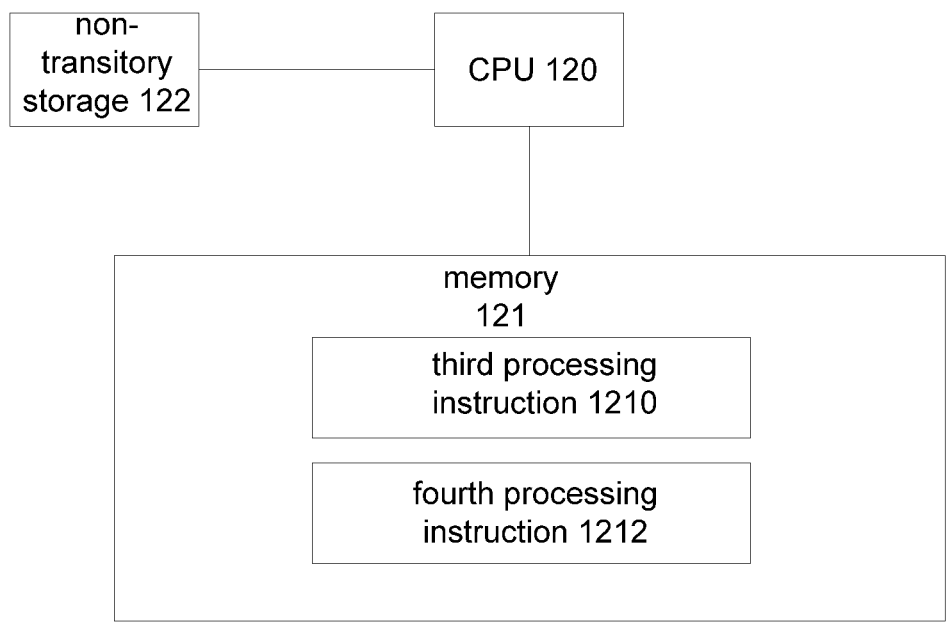

FIG. 12 is a schematic diagram illustrating structure of another image decoding device, in accordance with an example of the present disclosure.

DETAILED DESCRIPTIONS

To make technical solutions of the present disclosure more clear, detailed descriptions of the technical solutions of the present disclosure will be provided in the following, accompanying with attached figures and examples.

FIG. 4 is a flowchart illustrating an image encoding method, in accordance with an example of the present disclosure. As shown in FIG. 4, the method includes following blocks 41-43.

In block 41, when an inter predictive encoding is required to be performed on any image frame x, determine a reference image frame of image x. Image x is a P-frame image or a B-frame image.

To facilitate descriptions, image x is adopted to demonstrate any image frame in any video sequence.

When a predictive encoding is required to be performed on image x, firstly determine type of image x, e.g., to be I-frame image, P-frame image or B-frame image. If image x is an I-frame image, it is necessary to perform intra predictive encoding. If image x is a P-frame image or B-frame image, it is necessary to perform inter predictive encoding. Correspondingly, it is necessary to determine a reference image frame for image x.

How to determine the reference image frame for image x is a conventional technology.

In block 42, for each reference image frame, respectively perform the following processes: determine whether resolution of the reference image frame is the same as resolution of image x. When determining that the resolution of the reference image frame is different from the resolution of image x, adjust the resolution of the reference image frame to be the same as the resolution of image x.

In block 41, at least one reference image frame may be determined for image x. When one reference image frame is determined for image x in block 41, foregoing reference image frame may be adjusted, or may be not adjusted. When multiple reference image frames are determined for image x in block 41, following three cases may be included.

1) It is not necessary to adjust resolution of any reference image frame. That is, the resolution of each reference image frame is the same as the resolution of image x.

2) It is necessary to adjust resolution of each reference image frame. That is, the resolution of each reference image frame is different from the resolution of image x.

3) It is necessary to adjust resolutions of some reference image frames. It is not necessary to adjust resolutions of the remaining reference image frames.

No matter in which case, comparison and analysis are needed. Correspondingly, for each reference image frame, it is necessary to perform the following processes. Compare the resolution of the reference image frame with the resolution of image x, that is, determine whether the resolution of the reference image frame is the same as the resolution of image x. When the resolution of the reference image frame is different from the resolution of image x, adjust the resolution of the reference image frame to be the same as the resolution of image x. When the resolution of the reference image frame is the same as the resolution of image x, it is not necessary to adjust the resolution of the reference image frame.

Specifically speaking, for each reference image frame, when the resolution of the reference image frame is less than the resolution of image x, increase the resolution of the reference image frame, such that the resolution of the reference image frame is the same as the resolution of image x. When the resolution of the reference image frame is greater than the resolution of image x, reduce the resolution of the reference image frame, such that the resolution of the reference image frame is the same as the resolution of image x.

Methods for increasing the resolution of the reference image frame may include, but not limited to, image enlarging, or image filling. Methods for reducing the resolution of the reference image frame may include, but not limited to, image reducing, or image cropping.

FIG. 5 is a schematic diagram illustrating to adjust resolution of a reference image frame to be the same as resolution of image x, by image enlarging, in accordance with an example of the present disclosure. As shown in FIG. 5, a slash filled area demonstrates an enlarged part. How to enlarge an image is a conventional technology, e.g., employ an interpolation method, and so on.

FIG. 6 is a schematic diagram illustrating to adjust resolution of a reference image frame to be the same as resolution of image x, by image reducing, in accordance with an example of the present disclosure. As shown in FIG. 6, a slash filled area demonstrates a reduced part. How to reduce an image is also a conventional technology.

FIG. 7 is a schematic diagram illustrating to adjust resolution of a reference image frame to be the same as resolution of image x, by image filling, in accordance with an example of the present disclosure. As shown in FIG. 7, a slash filled area demonstrates a filled part. How to fill an image is conventional technologies, e.g., constant filling, duplicating filling, mirror filling, cycle filling and other methods, may be adopted to fill data around the reference image frame.

FIG. 8 is a schematic diagram illustrating the way to adjust resolution of a reference image frame to be the same as resolution of image x, by image cropping, in accordance with an example of the present disclosure. As shown in FIG. 8, a slash filled area demonstrates a cropped part. That is, crop the edge of the reference image frame. How to crop an image is also a conventional technology.

In practical applications, adjust the resolution of reference image frame with which foregoing method may be determined based on practical requirements.

For example:

1) when resolution change is resulted from increasing object size with closer distance, or reducing object size with longer distance, e.g., an oncoming vehicle with increasing size, followed by increasing resolution, and resolution of each image frame is different. For a vehicle on a reversed direction, the case is just the opposite. At this time, suppose the first image frame is I-frame image, the remaining image frames are P-frame image, and then, image scaling methods in FIG. 5 and FIG. 6 may be adopted. Adjust the resolution of the reference image frame to be the same as resolution of an image to be encoded, that is, image x. FIG. 5 corresponds to a case where an object size is increasing with closer distance. FIG. 6 corresponds to a case where an object size is reducing with longer distance.

2) When resolution of image x is greater than the resolution of the reference image frame, and the resolution of the reference image frame is reduced after being cropped, the image filling method shown in FIG. 7 may be adopted. Adjust the resolution of the reference image frame to be the same as the resolution of image x.

3) When resolution of image x is less than the resolution of the reference image frame, and the resolution of the reference image frame is increased after being filled, the image cropping method shown in FIG. 8 may be adopted. Adjust the resolution of the reference image frame to be the same as the resolution of image x.

When image x includes multiple reference image frames, each reference image frame may be adjusted with a same method, or with different methods, which may depend on practical situations.

Besides, how to determine a reason of resolution change of reference image frame is a conventional technology.

In block 43, after determining that resolution of each reference image frame is the same as resolution of image x, perform an inter predictive encoding on image x, based on each reference image frame.

After performing the processes in block 42, when the resolution of each reference image frame is the same as the resolution of image x, perform inter predictive encoding on image x based on each reference image frame. How to perform the inter predictive encoding is a conventional technology.

Based on foregoing descriptions, take resolution change in FIG. 3 as an example, after adopting solutions of the application, when the inter predictive encoding is required to be performed on the fourth image frame, firstly adjust the resolution of the reference image frame, i.e., the third image frame, to be the same as the resolution of the fourth image frame, and then perform the inter predictive encoding on the fourth image frame. Similarly, when the inter predictive encoding is required to be performed on the sixth image frame, firstly adjust the resolution of the reference image frame, i.e., the fifth image frame, to be the same as the resolution of the sixth image frame. And then, perform the inter predictive encoding on the sixth image frame. Thus, for the fourth and sixth image frames, it is not necessary to adopt the intra predictive encoding as in the prior art, so as to improve the encoding efficiency.

It should be noted that, in practical applications, for a reference image frame with resolution adjusted, it is necessary to record adjustment mode thereof, such as, position of a central point after image enlarging or image reducing, filled or cropped distance around the reference image frame, and record into an encoding bit stream, so as to facilitate subsequent decoding.

Specifically, decoding method may include:

A, when decoding any image frame y with inter predictive encoding performed is required, determine a reference image frame for image y; image y refers to the image frame y, which is similar in the following.

B, respectively perform the following processes on each reference image frame of image y: when determining that the resolution of the reference image frame is different from the resolution of image y, adjust the resolution of the reference image frame to be the same as the resolution of image y.

For example, compare the resolution of the reference image frame with resolution of image y, and determine whether they are the same. When determining that the resolution of the reference image frame is different from the resolution of image y, adjust the resolution of the reference image frame to be the same as the resolution of image y, based on the adjustment mode of the reference image frame recorded by the encoding bit stream.

Alternatively, directly read the encoding bit stream, and adjust resolution of a reference image frame corresponding to each adjustment mode to be the same as the resolution of image y, based on each adjustment mode recorded by the encoding bit stream.

C. When determining that the resolution of each reference image frame of image y is the same as the resolution of image y, decode image y based on each reference image frame.

How to decode is a conventional technology.

The present disclosure also provides an image encoding device and an image decoding device.

FIG. 9 is a schematic diagram illustrating structure of an image encoding device, in accordance with an example of the present disclosure. As shown in FIG. 9, the image encoding device includes a first processing module 901 and a second processing module 902.

When the inter predictive encoding is required to be performed on any image frame x, the first processing module 901 is configured to determine a reference image frame of image x, and inform the second processing module. Image x is a P-frame image, or a B-frame image.

The second processing module 902 is configured to perform the following processes on each reference image frame: determine whether resolution of a reference image frame is the same as resolution of image x; when determining that the resolution of the reference image frame is different from the resolution of image x, adjust the resolution of the reference image frame to be the same as the resolution of image x; when determining that the resolution of the reference image frame is the same as the resolution of image x, perform the inter predictive encoding on image x, based on each reference image frame.

When determining that resolution of a reference image frame is less than resolution of image x, the second processing module 902 is further configured to adjust the resolution of the reference image frame to be the same as the resolution of image x, by image enlarging or image filling.

When determining that resolution of a reference image frame is greater than resolution of image x, the second processing module 902 is further configured to adjust the resolution of the reference image frame to be the same as the resolution of image x, by image reducing or image cropping.

Besides, the second processing module 902 is further configured to record an adjustment mode of the reference image frame with adjusted resolution into an encoding bit stream, so as to facilitate subsequent decoding.

FIG. 10 is a schematic diagram illustrating structure of an image decoding device, in accordance with an example of the present disclosure. As shown in FIG. 10, the image decoding device includes a third processing module 101 and a fourth processing module 102.

When decoding any image frame y with inter predictive encoding performed is required, the third processing module 101 is configured to determine a reference image frame of image y, and inform the fourth processing module 102.

For each reference image frame, the fourth processing module 102 is configured to perform the following processes: when determining that resolution of a reference image frame is different from resolution of image y, adjust the resolution of the reference image frame to be the same as the resolution of image y; when determining that the resolution of the reference image frame is the same as the resolution of image y, decode image y based on each reference image frame.

FIG. 11 is a schematic diagram illustrating structure of another image encoding device, in accordance with an example of the present disclosure. As shown in FIG. 11, the image encoding device includes a central processing unit (CPU) 110, a memory 111 and a non-transitory storage 112.

The non-transitory storage 112 is configured to store a computer program, which may implement image encoding.

The CPU 110 is configured to load the computer program from the non-transitory storage 112 into the memory 111 to be run, and form computer executable instructions. The computer executable instructions include a first processing instruction 1110 and a second processing instruction 1112.

When the inter predictive encoding is required to be performed on any image frame x, the first processing instruction 1110 indicates to determine a reference image frame for image x. Image x is a P-frame image, or a B-frame image.

For each reference image frame, the second processing instruction 1112 indicates to respectively perform the following processes: determine whether the resolution of the reference image frame is the same as the resolution of image x; when determining that the resolution of the reference image frame is different from the resolution of image x, adjust the resolution of the reference image frame to be the same as the resolution of image x; when determining that the resolution of the reference image frame is the same as the resolution of image x, perform the inter predictive encoding on image x based on each reference image frame.

When determining that resolution of a reference image frame is less than the resolution of image x, the second processing instruction 1112 further indicates to adjust the resolution of the reference image frame to be the same as the resolution of image x, by image enlarging or image filling.

When determining that resolution of a reference image frame is greater than the resolution of image x, the second processing instruction 1112 further indicates to adjust the resolution of the reference image frame to be the same as the resolution of image x, by image reducing or image cropping.

Besides, the second processing instruction 1112 further indicates to record the adjustment mode of the reference image frame with resolution adjusted into an encoding bit stream, so as to facilitate subsequent decoding.

FIG. 12 is a schematic diagram illustrating structure of another image decoding device, in accordance with an example of the present disclosure. As shown in FIG. 12, the image decoding device includes a CPU 120, a memory 121 and a non-transitory storage 122.

The non-transitory storage 122 is configured to store a computer program, which may decode an image.

The CPU 120 is configured to load the computer program from the non-transitory storage 122 into the memory 121 to be run, so as to form computer executable instructions. The computer executable instructions include a third processing instruction 1210 and a fourth processing instruction 1212.

When decoding any image frame y with inter predictive encoding performed is required, the third processing instruction 1210 indicates to determine a reference image frame for image y.

For each reference image frame, the fourth processing instruction 1212 indicates to respectively perform the following processes: when determining that resolution of a reference image frame is different from resolution of image y, adjust the resolution of the reference image frame to be the same as the resolution of image y; when determining that resolution of a reference image frame is the same as the resolution of image y, decode image y based on each reference image frame.

The specific work flow of device example respectively illustrated with FIG. 9, FIG. 10, FIG. 11 and FIG. 12 may refer to corresponding descriptions in foregoing method examples, which are not repeated here.

It should be noted that, in each foregoing example, no matter for image x or image y, when comparing resolution of a reference image frame with resolution of image x or image y, it refers to comparing an original resolution (i.e., the resolution before adjustment) of the reference image frame with resolution of image x or image y.

In view of above, the foregoing is only preferred examples of the present disclosure, which is not for use in limiting the protection scope of the present disclosure. Any modifications, equivalent substitutions and improvements made within the spirit and principle of the present disclosure, should be covered by the protection scope of the present disclosure.

The invention claimed is:

1. An inter prediction method for encoding an image frame x, comprising:
   when performing the inter prediction for encoding the image frame x, determining a reference image frame of the image frame x, wherein the image frame x is a P-frame image or a B-frame image;
   for each reference image frame, respectively performing following processes with the existing sample of the reference image frame:
   determining whether a resolution of a reference image frame is the same as a resolution of the image frame x;
   when determining the resolution of the reference image frame is less than the resolution of the image frame x, and the resolution of the reference image frame is less due to image cropping, adjusting the resolution of the reference image frame to be the same as the resolution of the image frame x, by image filling;
   when determining the resolution of the reference image frame is greater than the resolution of the image frame x, and the resolution of the reference image frame is greater due to image filling, adjusting the resolution of the reference image frame to be the same as the resolution of the image frame x, by image cropping;
   when determining that the resolution of the reference image frame is the same as the resolution of the image frame x, performing the inter prediction for encoding the image frame x, based on each reference image frame.

2. The method according to claim 1, further comprising:
   recording an adjustment mode of the reference image frame with an adjusted resolution into an encoding bit stream;
   when decoding an image frame y with an inter predictive encoding, determining a reference image frame for the image frame y;
   for each reference image frame of the image frame y, respectively performing following processes:
   when determining that a resolution of a reference image frame is different from a resolution of the image frame y, adjusting the resolution of the reference image frame to be the same as the resolution of the image frame y, based on the adjustment mode of the reference image frame recorded by the encoding bit stream;
   when determining that the resolution of each reference image frame of the image frame y is the same as the resolution of the image frame y, decoding the image frame y based on each reference image frame.

3. An inter predictive encoding device, comprising:
   a memory and
   a processor communicating with the memory,
   the memory being configured to store instructions that when executed by the processor configure the device to:
   determine a reference image frame for an image frame x, when performing an inter predictive encoding on the image frame x, wherein the image frame x is a P-frame image or a B-frame image; and,
   respectively perform following processes on each reference image frame with the existing sample of the reference image frame: determine whether a resolution of a reference image frame is the same as a resolution of the image frame x, when determining that the resolution of the reference image frame is less than the resolution of the image frame x, and the resolution of the reference image frame is less due to image cropping, adjust the resolution of the reference image frame to be the same as the resolution of the image frame x, by image filling; when determining that the resolution of the reference image frame is greater than the resolution of the image frame x, and the resolution of the reference image frame is greater due to image filling, adjust the resolution of the reference image frame to be the same as the resolution of the image frame x, by image cropping; when determining that the resolution of the reference image frame is the same as the resolution of the image frame x, perform the inter predictive encoding on the image frame x based on each reference image frame.

4. The device according to claim 3, wherein the device is further configured to record an adjustment mode of the reference image frame with an adjusted resolution into an encoding bit stream.

5. An inter prediction method for decoding an image frame y, comprising:

when decoding the image frame y with an inter predictive encoding, determining a reference image frame for the image frame y;

respectively performing following processes on each reference image frame with the existing sample of the reference image frame:

when determining the resolution of the reference image frame is less than the resolution of the image frame y, and the resolution of the reference image frame is less due to image cropping, adjusting the resolution of the reference image frame to be the same as the resolution of the image frame y, by image filling;

when determining the resolution of the reference image frame is greater than the resolution of the image frame y, and the resolution of the reference image frame is greater due to image filling, adjusting the resolution of the reference image frame to be the same as the resolution of the image frame y, by image cropping;

when determining that resolution of each reference image frame is the same as the resolution of the image frame y, decoding the image frame y based on each reference image frame.

6. An inter predictive decoding device, comprising a memory and a processor communicating with the memory, the memory being configured to store instructions that when executed by the processor configure the device to:

when decoding an image frame y with an inter predictive encoding, determine a reference image frame for the image frame y; and, respectively perform following processes on each reference image frame with the existing sample of the reference image frame:

when determining that the resolution of the reference image frame is less than the resolution of the image frame y, and the resolution of the reference image frame is less due to image cropping, adjust the resolution of the reference image frame to be the same as the resolution of the image frame y, by image filling;

when determining that the resolution of the reference image frame is greater than the resolution of the image frame y, and the resolution of the reference image frame is greater due to image filling, adjust the resolution of the reference image frame to be the same as the resolution of the image frame y, by image cropping;

when determining that resolution of each reference image frame is the same as the resolution of the image frame y, decode the image frame y based on each reference image frame.

* * * * *